Oct. 9, 1928.
A. Z. MAMPLE
1,687,378
METHOD OF AND APPARATUS FOR SOLDERING CABLE BONDING DEVICES
Filed June 8, 1927
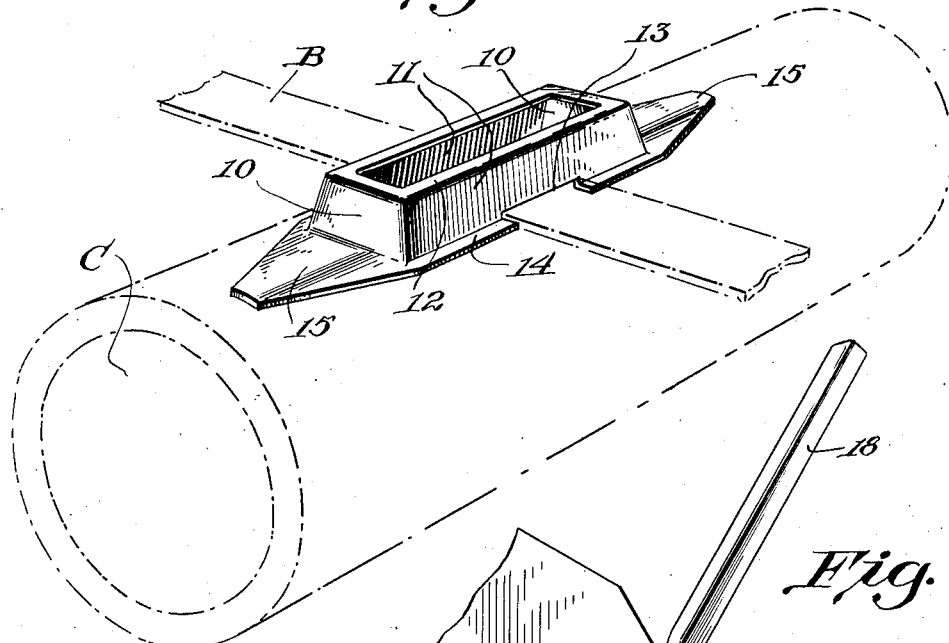
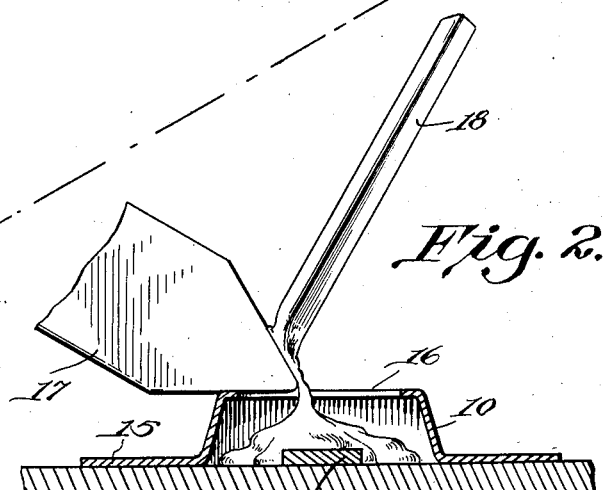
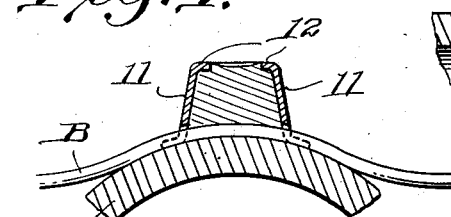
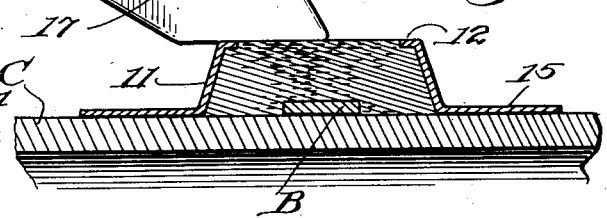
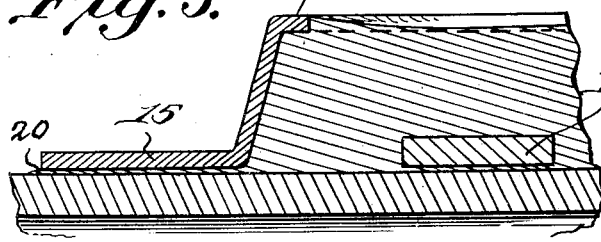
Inventor
A. Z. Mample
Eugene C. Brown
Attorney Patented Oct. 9, 1928.

1,687,378

UNITED STATES PATENT OFFICE.

ADOLPH Z. MAMPLE, OF GLEN ROCK, NEW JERSEY, ASSIGNOR TO THE WESTERN UNION TELEGRAPH COMPANY, OF NEW YORK, N. Y., A CORPORATION OF NEW YORK.

METHOD OF AND APPARATUS FOR SOLDERING CABLE-BONDING DEVICES.

Application filed June 8, 1927. Serial No. 197,434.

This invention relates to the bonding of metal coated cables.

It is common practice in the use of electrical cables such as are covered with a metal sheath to make permanent electrical connections to the sheaths of such cables. Such connections are used in aerial cable construction for the purpose of electrically grounding the sheaths of the cables and to bond them to the supporting messenger, while in the case of underground cable construction such connections are used to bond the sheaths of the cables together, whenever two or more are in juxtaposition, to eliminate differences of potential between the cables and to make connection of electrolysis drainage wires as in the case of mitigating electrolytic corrosion. These cables are frequently bonded by strips of copper or other suitable conducting material soldered to the cables so that the sheaths are connected electrically one to the other and since such cables are commonly sheathed with lead or some similar metal having a low fusible point capable of being readily bent, injury is apt to be done the sheathing by the soldering process. For instance, if the soldering iron comes in contact with the sheathing of such a cable the sheathing itself is apt to be melted to such an extent that leaks may be established allowing water or moisture to find its way into the interior of the cable to the great detriment of the insulation and the possible grounding or short-circuiting of some of the conductors in the cable. Even if the soldering iron does not actually melt sufficient of the cable to at once establish a leak, the heat effect produced by the hot iron in contact with the cable in the usual methods of soldering is such as to cause a change in the crystalline structure of the sheath or reduction in thickness, so that bending or vibration of the cable at such points is very apt to produce cracks and consequent leaks in the sheath.

The principal objects of the present invention are to provide a novel method of securing bonds to cables wherein the bond is soldered to the cable under such conditions that the soldering iron is prevented from injuring the sheath by contact therewith, and to provide a novel and improved casing device for molding the applied solder into proper shape and for preventing contact of the soldering iron with the sheath.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a perspective view of a mold constructed in accordance with this invention and for the purpose of carrying into effect the improved method, a portion of a cable and a portion of a bond strip being shown in broken lines.

Figure 2 is a longitudinal sectional view through the casing showing the soldering operation being carried into effect and partially completed.

Figure 3 is a view similar to Figure 2 but illustrating the final step in the operation.

Figure 4 is a cross-section through the casing and a portion of the cable showing the bond positioned on the cable.

Figure 5 is an enlarged longitudinal section through the joint as completed and disclosing the manner in which the solder secures the bond and the casing to the cable.

Figure 6 is a longitudinal section showing a casing having a closed top wall and the solder pre-cast therein.

In carrying out the objects of this invention there is provided a suitable casing of sheet metal preferably sheet copper or brass which is tinned, having inclined end walls 10 and similar inclined side walls 11 which form an elongated box of truncated pyramidal shape. Extending inwardly from the top edge of each side wall is a flange 12, forming a continuous inwardly projecting peripheral flange at the top of the walls of the casing. Centrally of each side wall the casing is notched or cut away, as at 13, so that the bond B may pass beneath the casing when the latter is seated on the table C. The bottom walls are outwardly flanged to provide lateral supporting feet 14 and elongated end supporting feet 15 which, with the device in position on the cable, rest on the surface of the sheath so that by passing wires temporarily around the cable and over the feet 15 the casing may be held in position. It is to be particularly noted that the proportions of the casing and flanges 12 are such that there is provided in the top of the box-like casing a narrow elongated slot 16 of less width than the point of the usual soldering iron 17.

One method of soldering the bond to the cable is illustrated in Figs. 1, 2 and 3. The casing is placed in position with the bond extending through the notches 13 as indicated in Fig. 1. The casing may be held in position during the soldering operation by means of the wires passing around the cable and over the end flanges 15. A soldering iron having previously been thoroughly heated, is placed with its point resting on one end flange 12 and overhanging the space between said flanges, as shown in Fig. 2. The operator then presses a stick of solder 18 against the upper side of the point of the iron, causing the solder to melt and run off of the point into the casing until the casing is completely filled. The liquid solder is chilled upon coming into contact with the relatively cold mass of the cable and bond so that the mere filling of the casing with the solder will not properly and safely effect the attachment of the bond to the cable sheath. Accordingly, when the casing has been filled the operator allows the soldering iron to rest on top of the mass of solder in the casing as shown in Fig. 3, thereby conducting the heat of the iron through the mass of solder until it is entirely reliquefied and flows beneath the lower or foot flanges of the casing and beneath the bond B and the feet 15 to which it adheres as indicated 20 in Fig. 5, thus forming a perfect union between the bond, the casing and the sheath, the casing remaining as a permanent part of the joint being integrally united by the solder to the bond and the sheath.

In some instances it is preferably to provide the casings with the solder pre-cast in position, so that it will merely be necessary to apply the soldering iron to the top of the casing to liquefy the solder and cause it to properly unite the bond and the casing to the sheath. The casing may have an open top as shown in Figs. 1 to 5 or the top may be closed as shown in Fig. 6. In each of these cases, however, the solder in the mold is liquefied by the heat of the soldering iron resting on top of the mold, the heat being conducted through the solder to the bond and sheath to form the union between the metals.

I claim:

1. The method of soldering metals together without injury to the metals, which consists in positioning a heated soldering iron in spaced relation to the contacting metal articles, melting solder by the heat of the iron and directing the liquefied solder upon the metals at their point of contact, confining the melted solder until it forms a bridge between said metals and the iron, remelting said bridge of solder by contact with the heated iron and heating the metals by conduction through the solder to thereby cause a union between the metals and the solder.

2. The method of securing a bonding strip to a metal sheathed cable, which consists in positioning a strip on the cable, superposing a walled casing thereover, positioning a heated soldering iron upon the casing so that it overhangs the space within the casing but spaced from the cable, and applying solder to the iron, directing the liquefied solder into the casing and maintaining the solder in molten condition and conductively heating the metals from the heated soldering iron through the liquefied solder.

3. A casing for use in soldering bonding strips to metal sheathed cables, the casing forming an integral part of the soldered joint, comprising a body of tinned sheet metal having side and end walls provided at their upper edges with an inwardly extending peripheral flange arranged to form a long narrow slot of less width than the width of a standard soldering iron.

4. A casing for use in soldering bonding strips to metal sheathed cables, the casing forming an integral part of the soldered joint, comprising a body of tinned sheet metal having side and end walls provided at their upper edges with an inwardly extending peripheral flange arranged to form a long narrow slot of less width than the width of a standard soldering iron, the lower edges of the side walls being notched to fit over a bonding strip.

5. A casing for use in soldering bonding strips to metal sheathed cables, the casing forming an integral part of the soldered joint, comprising a body of tinned sheet metal having side and end walls provided at their upper edges with an inwardly extending peripheral flange arranged to form a long narrow slot of less width than the width of a standard soldering iron, and base flanges extending outwardly from the lower edges of the end walls.

6. A casing for use in soldering bonding strips to metal sheathed cables, the casing forming an integral part of the soldered joint, comprising a hollow tinned sheet metal casing forming a housing to confine a mass of solder, the base of said casing being notched to fit over a bonding strip, said casing permitting the heat from a soldering iron to be conducted through the mass of solder while maintaining the soldering iron spaced from the cable sheath.

In testimony whereof I affix my signature.

ADOLPH Z. MAMPLE.